(12) United States Patent
Swaim et al.

(10) Patent No.: US 7,360,649 B2
(45) Date of Patent: *Apr. 22, 2008

(54) ENTERTAINMENT SYSTEM COMPRISING SUSPENSION PLATFORM

(75) Inventors: Jeffrey A. Swaim, Santa Maria, CA (US); Christopher Toll, Nipomo, CA (US)

(73) Assignee: CFS Products, Inc., Santa Maria, CA (US)

( * ) Notice: Subject to any disclaimer, the term of this patent is extended or adjusted under 35 U.S.C. 154(b) by 194 days.

This patent is subject to a terminal disclaimer.

(21) Appl. No.: 10/712,388

(22) Filed: Nov. 12, 2003

(65) Prior Publication Data

US 2004/0112931 A1    Jun. 17, 2004

Related U.S. Application Data

(63) Continuation-in-part of application No. 10/012,272, filed on Dec. 1, 2001, now Pat. No. 6,685,016.

(51) Int. Cl.
*B60R 11/02* (2006.01)
*B65D 85/38* (2006.01)

(52) U.S. Cl. .................. 206/320; 206/576; 224/275; 224/929; 297/188.06

(58) Field of Classification Search ........... 206/320, 206/576, 736, 751, 756, 757, 762; 190/100, 190/107, 109, 110, 111, 112; 224/539, 929, 224/930, 418, 275; 297/188.04, 188.05, 297/188.06, 188.07, 188.2, 188.21; D3/294, D3/298

See application file for complete search history.

(56) References Cited

U.S. PATENT DOCUMENTS

| 1,613,536 A | * | 1/1927 | Rose .................. 132/315 |
| 4,259,568 A | * | 3/1981 | Dynesen .............. 235/1 D |
| 4,383,626 A | | 5/1983 | Weinblatt |
| 4,635,110 A | | 1/1987 | Weinblatt |
| 5,524,754 A | * | 6/1996 | Hollingsworth ........ 206/320 |
| D380,612 S | * | 7/1997 | Kelley et al. ........... D3/289 |
| 5,725,189 A | | 3/1998 | Landy |
| 5,771,305 A | | 6/1998 | Davis |
| 5,887,723 A | | 3/1999 | Myles et al. |
| 5,887,777 A | | 3/1999 | Myles et al. |

(Continued)

OTHER PUBLICATIONS

Pictures of device first offered for sale in mid-Nov. 2001.

*Primary Examiner*—Jacob K. Ackun, Jr.
*Assistant Examiner*—Shian Luong
(74) *Attorney, Agent, or Firm*—Knobbe, Martens, Olson & Bear, LLP

(57) ABSTRACT

An entertainment system, comprising an entertainment device, a suspension platform, and, optionally, a storage bag, is described. The suspension platform is removably secured to a seat back of a front seat in the passenger compartment of a passenger vehicle. Alternatively, the suspension platform may be removably suspended between two front seats of a passenger vehicle. In either location the suspension platform provides means for securing an entertainment device inside the passenger vehicle, for convenient use by one or more occupants of rear seats in the passenger vehicle. The suspension platform may be redisposed into a configuration suitable for protecting the entertainment device during storage or transport. A storage bag provides means for storing the entertainment device and suspension platform, and also such accessories as may be employed with these items.

19 Claims, 10 Drawing Sheets

U.S. PATENT DOCUMENTS

| | | | |
|---|---|---|---|
| 5,960,952 A * | 10/1999 | Chen | 206/320 |
| 5,971,148 A | 10/1999 | Jackson | |
| 5,996,749 A * | 12/1999 | Hillsberg et al. | 190/109 |
| 6,092,705 A | 7/2000 | Meritt | |
| 6,097,448 A | 8/2000 | Perkins | |
| 6,109,434 A | 8/2000 | Howard, Jr. | |
| 6,145,661 A * | 11/2000 | Jung | 206/320 |
| D435,343 S * | 12/2000 | Eskandry | D3/284 |
| 6,183,133 B1 * | 2/2001 | Roegner | 383/39 |
| 6,216,927 B1 | 4/2001 | Meritt | |
| 6,269,948 B1 | 8/2001 | Jackson | |
| 6,283,288 B1 | 9/2001 | Lee | |
| 6,283,299 B1 * | 9/2001 | Lee | 206/760 |
| 6,318,552 B1 * | 11/2001 | Godshaw | 206/320 |
| 6,354,477 B1 * | 3/2002 | Trummer | 224/575 |
| 6,473,315 B2 | 10/2002 | Denmeade | |
| 6,685,016 B2 * | 2/2004 | Swaim et al. | 206/320 |
| D500,923 S * | 1/2005 | Gonzalez et al. | D3/301 |
| 2001/0011664 A1 * | 8/2001 | Meritt | 224/275 |

\* cited by examiner

ENTERTAINMENT SYSTEM COMPRISING SUSPENSION PLATFORM

REFERENCE TO RELATED APPLICATION

This application is a continuation-in-part of application Ser. No. 10/012,272, filed Dec. 1, 2001 now U.S. Pat. No. 6,685,016, entitled "ENTERTAINMENT SYSTEM COMPRISING SUSPENSION PLATFORM."

BACKGROUND OF THE INVENTION

1. Field of the Invention

The invention relates to an entertainment system for use in a passenger vehicle. In particular, the invention relates to a suspension platform that permits the secure temporary installation of an entertainment device in a passenger vehicle. The suspension platform also permits easy removal of the entertainment system from the passenger vehicle.

2. Description of the Related Art

There are many devices and systems for the entertainment of passengers in passenger vehicles. As used herein, the term "passenger vehicle" describes any vehicle used for transportation of people. The term is particularly applicable to automobiles, vans, buses, boats, motor homes, and even airplanes, but not limited thereto.

Such devices may be as simple as the car radio that is standard equipment for many models of modern automobiles. Some luxury automobiles are equipped with devices by which the operator of the vehicle may obtain information regarding his present location; such devices combine communications equipment and global positioning systems. Conversion vans may be equipped with television sets or videotape players. Such equipment is typically permanently installed, to deter theft, but at the price of difficult and expensive installation by experts.

Commercial buses and airplanes may be fitted with entertainment systems, through which passengers throughout the vehicle may view entertainment programming, such as a movie, selected by the crew of the vehicle. Such systems typically comprise a videotape recorder and a plurality of viewing screens. The viewing screens may comprise projectors and reflective screens hung from the ceiling of the vehicle. Alternatively, viewing screens may be cathode ray tube (CRT) monitors mounted in overhead consoles, or liquid crystal display (LCD) monitors built into armrests or the seatbacks of the vehicle. Entertainment systems of this type are not widely available as original equipment in passenger cars because of cost and warranty considerations, and because in a very large fraction of all passenger car mileage in the United States, the car is occupied only by the driver.

It became apparent to the inventor that there is a need for flexible entertainment systems for use in passenger vehicles. While a family with young children is making a long automobile trip, those children often become bored, in part because they sit in a back seat and they are too short to see outside scenery past the high seat backs of the front seats. With respect to commercial passenger vehicles, the need is manifested by the desire of a passenger to be entertained with programming other than that provided through a system permanently installed in the vehicle. In either of these situations, the possibility of easily removing an entertainment system from the vehicle is, at very least, desirable. Of course, in the context of a commercial vehicle, removal from the vehicle is essential. Identification of a market for such products led to development of the apparatus disclosed herein.

In the context of the present discussion, the term "entertainment device" is taken to include devices such as compact disk players (CD players), digital video disk players (DVD players), laptop computers, global positioning systems (GPS devices), video games such as those made by Nintendo, Sega or Sony, and other similar devices. Interpretation of the term must be inclusive, specifically including such similar or related devices not specifically mentioned herein. Many entertainment devices are provided with a viewing screen as an integral feature thereof. The apparatus disclosed herein is particularly suited to use with such devices, but not limited thereto; thus, the use of the term "entertainment device" should not be limited thereto. A wide variety of entertainment devices of suitable configuration are commercially available, and the apparatus disclosed herein may be used in conjunction with such entertainment devices.

Hereinafter, the term "entertainment system" is taken to comprise an entertainment device and means for securing such a device in a passenger vehicle, such that it may be conveniently used by one or more passengers. The term may also be taken to include means for protecting and carrying the entertainment device outside the passenger vehicle.

Prior art in the field of entertainment systems has followed development of entertainment devices. Early entertainment systems incorporate television sets having cathode ray tubes (CRT TVs). Weinblatt (U.S. Pat. No. 4,635,110) disclosed an entertainment system in which apparatus for securing a TV and VCR inside an automobile is laid over the back of a front seat of the automobile. Development of a CRT TV with a videotape cassette recorder/player (VCR) incorporated led to the invention by Landy (U.S. Pat. No. 5,725,189) of a device for securing such a combination device into an automobile. Perkins (U.S. Pat. No. 6,097,448) discloses a means of securing such a device to the backs of two front seats of an automobile. Development of liquid crystal display (LCD) televisions and monitors led to inventions by Lee (U.S. Pat. No. 6,283,299) and Meritt (U.S. Pat. Nos. 6,092,705 and 6,216,927) of devices that secure the combination of an LCD display and a playback device, such as a VCR or DVD player, into an automobile. Meritt's '927 patent also discloses apparatus for securing a game-type entertainment device having a case with a substantially vertical orientation to a front seat of an automobile. However, Meritt makes no provision for an entertainment device having a substantially horizontal orientation, and a hinged lid, where a viewing screen is incorporated in that hinged lid. Such devices, which include portable DVD players and laptop computers, are fully self-contained, having sufficient capability of their internal batteries to permit extended use without external power. Of course, such devices may be operated on external power to extend operating time. Meritt's teachings are inapplicable to such entertainment devices.

Meritt's '927 patent contains a summary of development of devices relating to his invention, which summary is germane to disclosed embodiments of the present invention. Thus, the disclosures thereof are incorporated herein by reference.

Portable, or laptop, computers have been designed for operation while the user balances the computer on his lap. However appropriate such use might be when the user is seated in a chair, doing so in a passenger vehicle creates the potential hazard that the computer may fly uncontrolled in the passenger compartment, in the event of an accident or sudden maneuver. Some of the many inventions relating to protective case for portable computers may serve to alleviate, but not solve, this problem. For example, Jackson (U.S. Pat. Nos. 5,971,148 and 6,269,948) discloses a protective case that the user drapes across his knees, partially securing the computer to his knees. Howard, Jr. (U.S. Pat. No. 6,109,434) discloses a protective case that a user may secure to one wrist by a strap incorporated in the case, while operating the computer with the other hand. Myles et al (U.S. Pat. Nos. 5,887,723 and 5,887,777) disclose a protective case that incorporates a strap placed around the neck of a user to support a computer. None of these devices truly address the issue of a computer flying uncontrolled in the passenger compartment, and none are suitable for use by children in the back seat of an automobile.

It is believed that the entertainment system, as set forth herein, is neither taught nor rendered obvious by the prior art cited above.

SUMMARY OF THE INVENTION

It is an object of a disclosed embodiment of the present invention to provide a means for removably securing an entertainment device inside the passenger compartment of a passenger vehicle. In particular, it is an object of this disclosed embodiment of the present invention to secure the entertainment device to the seat back of a front seat of such a passenger vehicle, so that the entertainment device may be conveniently used by an occupant of the rear seat of the passenger vehicle.

It is another object of a disclosed embodiment of the present invention to provide a means for removably securing an entertainment device that may secure such a device either behind one front seat, or in the space between two front seats.

It is another object of a disclosed embodiment of the present invention to provide a means for protecting the entertainment device, both while it is secured in a passenger vehicle and while it is being transported and/or stored outside the passenger vehicle.

It is still another object of a disclosed embodiment of the present invention to provide such means in a compact form that can be conveniently stored with the entertainment device.

It is yet another object of a disclosed embodiment of the present invention to provide a means for securing in the passenger compartment of a passenger vehicle any sort of entertainment device such as compact disk players (CD players), digital video disk players (DVD players), laptop computers, global positioning systems (GPS devices), and video games, and the like.

It is a further object of a disclosed embodiment of the present invention to provide means for removably securing an entertainment device to any type of front seat, whether the seat has a high back, a movable head restraint, or neither of these design features.

It is a yet further object of a disclosed embodiment of the present invention to provide a means for holding and carrying accessories that may be used with an entertainment device.

It is a still further object of a disclosed embodiment of the present invention to provide an entertainment system that may be positioned, as desired, for easy use by occupants of the rear seat of a passenger vehicle.

It is yet another object of a disclosed embodiment of the present invention to provide an apparatus for removably mounting an entertainment device, such as a digital video player or laptop computer, to at least one seat of a vehicle. In particular, the apparatus has an open configuration and a closed configuration, comprised of a front portion and a rear portion, where the front portion and rear portion are configured to form a container in a closed configuration and the container is sized to receive the entertainment device for transporting said device. Also, the front portion and rear portion are configured to form a platform in an open configuration, where the platform is adapted to be releasably attached to at least one seat of a vehicle and is capable of mounting said entertainment device for use.

It is another object of a disclosed embodiment of the present invention to provide an apparatus for removably mounting an entertainment device, such as a digital video player or laptop computer, to at least one seat of a vehicle, where the entertainment device has a viewing screen portion hinged to a central console portion, and the apparatus comprises a platform having a generally triangular cross section comprised of a front portion and rear portion which meet at an upper apex. Additionally, the front portion is configured to receive the entertainment device such that the bottom of the console portion is inclined relative to both the horizontal and vertical.

The entertainment system of the various preferred embodiments of the present invention, as described herein, accomplishes these and other objectives through a novel combination of design concepts and embodiments thereof. The system comprises an entertainment device and a suspension platform. Specifically, the suspension platform can comprise three panels, connected edge-to-edge, so that the panels may be arranged to form a sort of rigid triangular tube. The suspension platform may alternatively be arranged in a flat configuration with the entertainment device therewithin. In the triangular configuration, the interior of the suspension platform, and the entertainment device secured thereto, are exposed for the convenience of the user. At least one strap is provided to secure the suspension platform to the back of one front seat (or both front seats) of a passenger vehicle. The straps are of sufficient length to encircle the front seat(s) of a passenger vehicle, and adjustable in length; they may be separated from the suspension platform for convenient storage. To secure the suspension platform to one front seat, two straps may suffice. To secure the suspension platform between two front seats, at least three straps will normally be required.

It should be noted that although the term "suspension platform" is used herein to describe a platform by which an entertainment device may be supported in a passenger vehicle, that same element may also act as a protective case while the entertainment device is stored or transported.

In order to collect and carry the accessories that may be used with an entertainment device, a large storage bag, of sufficient size to carry the suspension platform with the entertainment device therewithin, along with those accessories, is also provided.

Other objects and advantages of preferred embodiments of the present invention will be understood and appreciated by reference to the following detailed description of the invention, and the appended claims and drawings. It should be noted that like reference symbols in the drawings and related text indicate the same or similar components.

BRIEF DESCRIPTION OF THE DRAWINGS

Preferred embodiments of the present invention are depicted in the accompanying drawings. Various features and advantages of these presently preferred embodiments will be better understood when the specification and claims hereof are considered in conjunction with the accompanying drawings. It is understood that the scope of the invention is not limited by the precise features and arrangements illustrated herein. In the accompanying drawings, like reference symbols designate the same or similar features throughout the several views. In the accompanying drawings:

DETAILED DESCRIPTION OF THE PREFERRED EMBODIMENT

In one preferred embodiment, an entertainment system comprises an entertainment device, a suspension platform, and an optional storage bag.

Direction terms used herein, such as upper and lower, left and right, reflect orientation and position of a user of the entertainment device, when the user is seated in a rear seat of a passenger vehicle. Interior and exterior surfaces of components of the suspension platform are identified relative to the closed configuration of the case.

Figure 1:
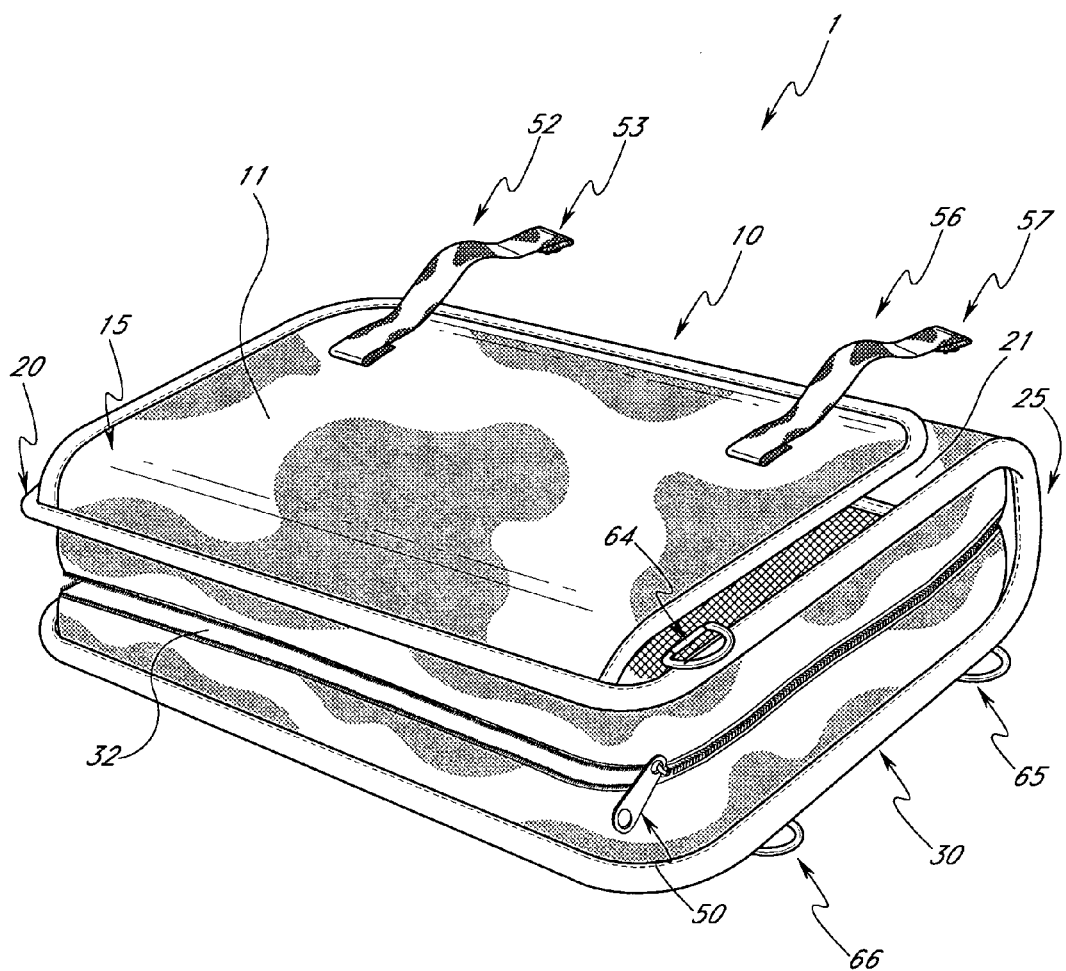
FIG. 1 illustrates, in schematic form, a suspension platform in its closed configuration.
Figure 2:
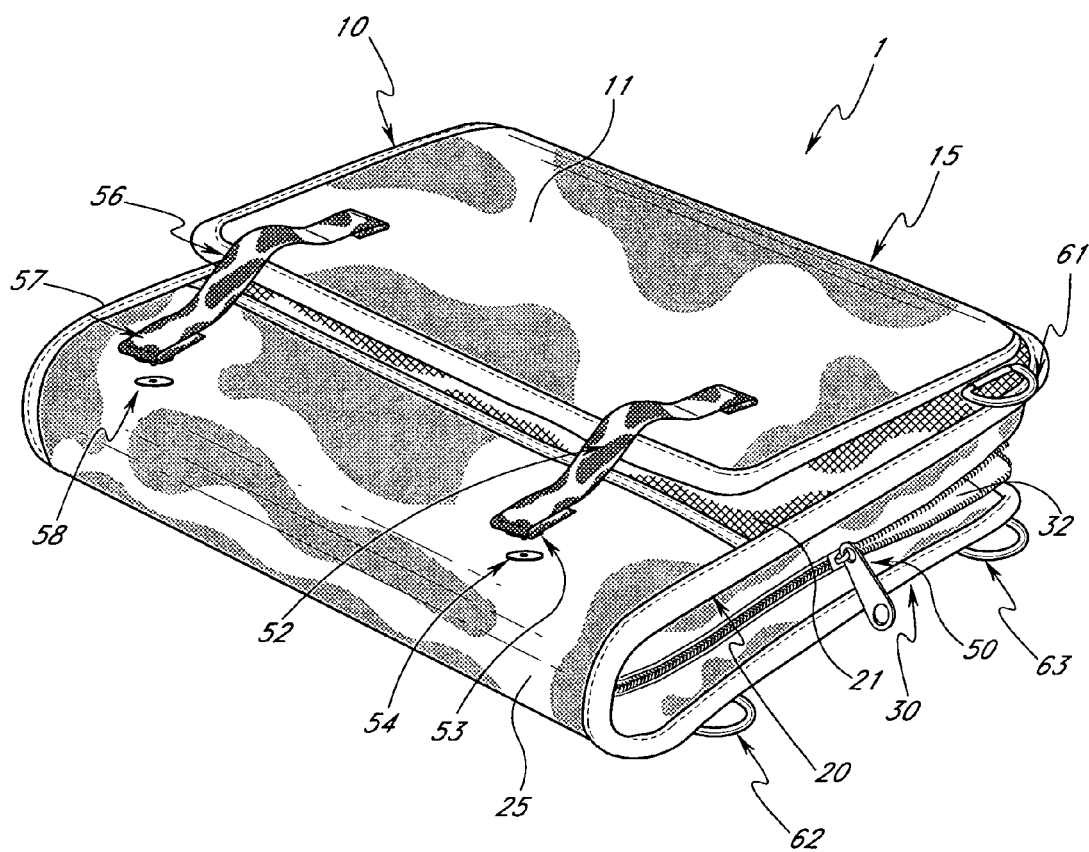
FIG. 2 illustrates, in schematic form, a suspension platform in its closed configuration. The direction of view of FIG. 2 is diagonally opposite to, and slightly above that of FIG. 1.

FIGS. 1 and 2 show the suspension platform of one preferred embodiment in its closed configuration. The suspension platform, shown generally at 1, is comprised of three panels, a first panel 10, a second panel 20 and a third panel 30. The exterior surfaces of the first and second panels are shown at 11 and 21, respectively. The interior surface of the third panel is shown in FIG. 2 at 32. There is a first flexible connection 15 between the rear edge of the first panel 10 and the lower edge of the second panel 20. There is a second flexible connection 25 between the upper edge of the second panel 20 and the upper edge of the third panel 30. In FIG. 1, the lower edges of the second and third panels, shown at 20 and 30, respectively, the rear edge of the first panel 10, and the first flexible connection 15 are shown in the foreground of the figure. In FIG. 2, the upper edges of the second and third panels, shown at 20 and 30, respectively, the front edge of the first panel 10, and the second flexible connection 25 are shown in the foreground of the figure. To secure panels 20 and 30 in their appropriate closed positions, the panels are secured to each other by separable closure means, which in this preferred embodiment of the invention is a zipper 50. Alternatively, tabs having mating patches of hook-and-loop material may be employed. An entertainment device may be secured between panels 20 and 30 by closing the zipper 50. Panels 10 and 20 are separably secured to each other, in this case by tabs 52 and 56, each having a snap connector, shown at 53 and 57, respectively, thereon. Mating snap connectors, sometimes called snap studs, shown at 54 and 58, respectively, are affixed to the exterior surface 21 of the second panel 20. Mating hook-and-loop material can also be used. In its closed configuration, the suspension platform of one preferred embodiment provides a compact package that protects an entertainment device enclosed therein.

Figure 3A:
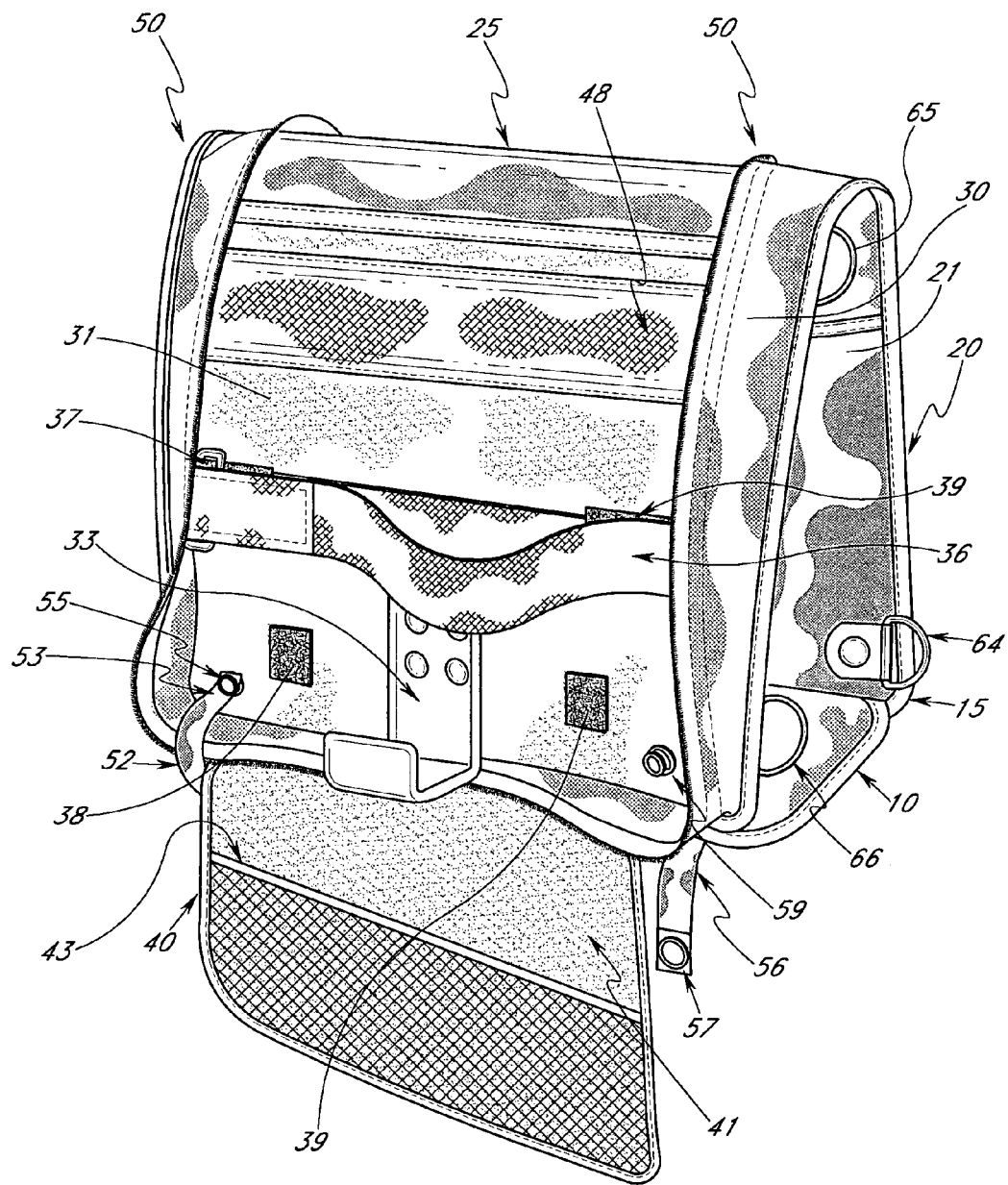
FIG. 3A illustrates, in schematic form, a suspension platform in its open configuration. The viewpoint in this figure is from the left side, and slightly to the rear of, the suspension platform.
Figure 4:
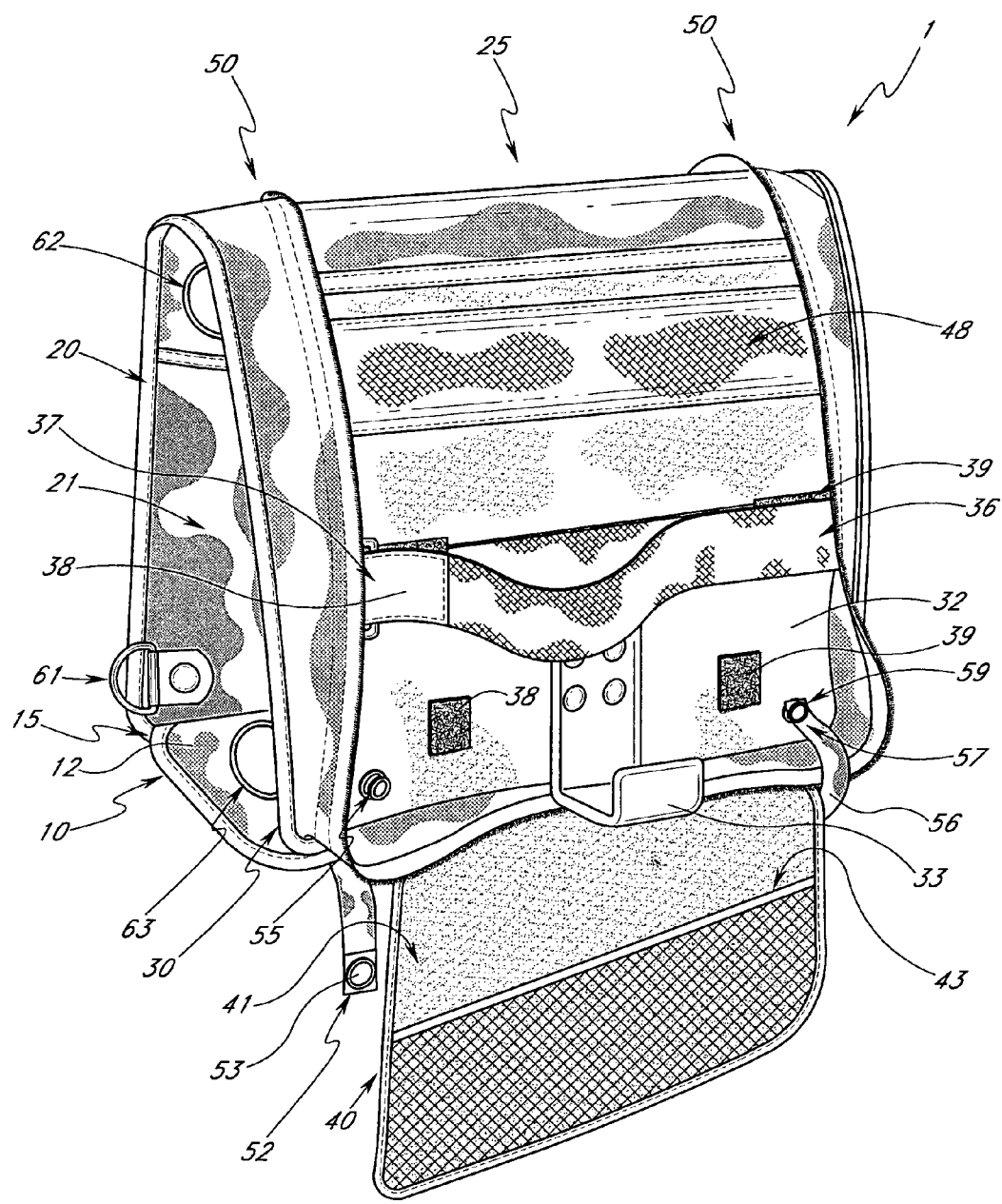
FIG. 4 illustrates, in schematic form, a suspension platform in its open configuration. The viewpoint in this figure is to from the right shoulder of the user of an entertainment device that might be installed in the suspension platform.
Figure 5:
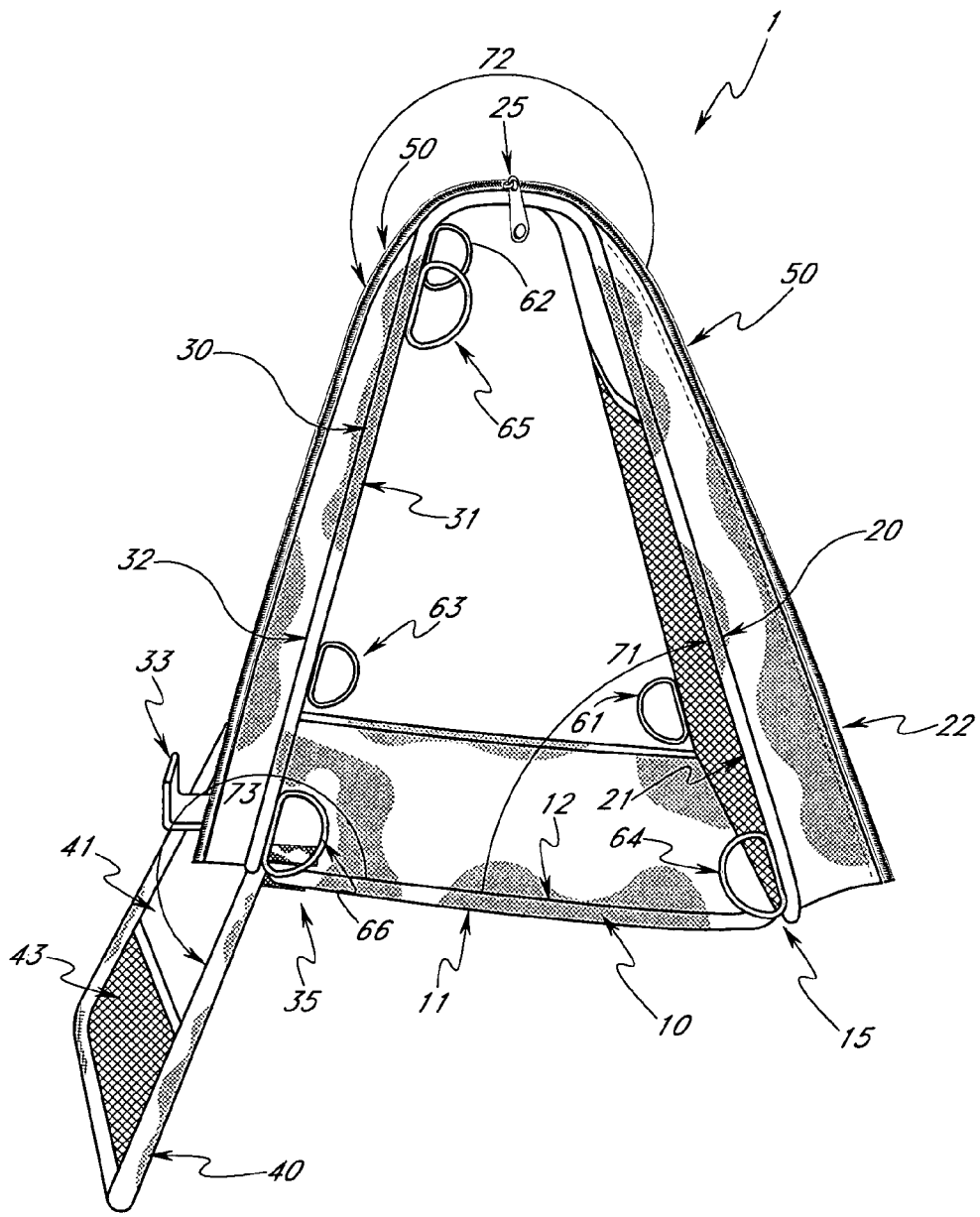
FIG. 5 provides a schematic view of the right side of a suspension platform showing the redisposition of a suspension platform from its closed configuration to its open configuration, and the extent of rotation of components thereof with respect to other components required by such redisposition.

FIGS. 3A and 4 illustrate the suspension platform of one preferred embodiment in its open configuration. In redisposing the suspension platform from its closed to open configurations, the first flexible connection 15 may provide as little as about 60 degrees of rotation of panel 20 with respect to panel 10, as shown at 71 in FIG. 5. However, the second flexible connection 25 may provide at least 300 degrees of rotation of panel 30 with respect to panel 20, as shown at 72 in FIG. 5. Greater flexibility of the flexible connections may allow further rotation of the panels involved, and may be preferred. In redisposing the case to its open position, panels 20 and 30 are bent almost fully back on themselves. To complete the redisposition, snap connectors 53 and 57 on tabs 52 and 56 are engaged with a second set of mating snap connectors 55 and 59, respectively, situated on the interior surface 32 of panel 30. In its open configuration, the suspension platform comprises a triangular structure that is quite rigid, even though fabric tabs may be used as a separable connection between panels 10 and 30. Redisposition of the suspension platform is illustrated in FIG. 5. The angle of rotation of panel 20 with respect to panel 10 is designated 71. The angle of rotation of panel 30 with respect to panel 20 is designated 72. The angle of rotation of panel 40 with respect to panel 10 is designated 73.

Figure 3B:
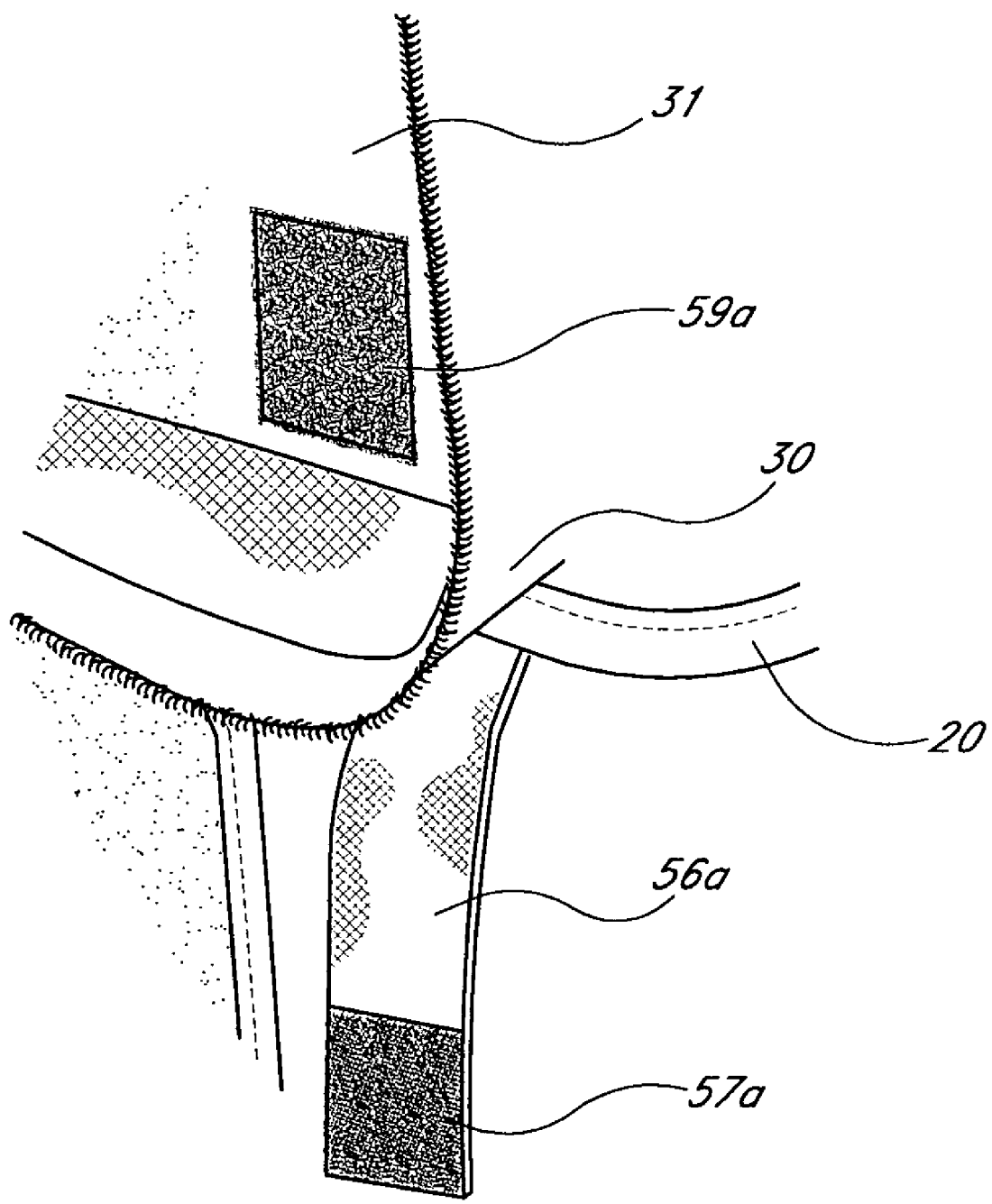
FIG. 3B illustrates the hook-and-loop embodiment for the flexible connections.

FIG. 3B illustrates a portion of FIG. 3A where hook-and-loop material is utilized for the flexible connections of FIG. 3A. In this embodiment, panels 10 and 30 are separably secured to each other, in this case by tab 56a, having a connector of hook-and-loop material, shown at 57a, respectively, thereon. Mating hook-and-loop material, shown at 59a, is affixed to the interior surface 32 of panel 30. In this embodiment, mating hook-and-loop material could also be used in place of the other connections, such as the connection between panel 10 and 20 in the closed configuration.

The suspension platform of one preferred embodiment includes means for securing an entertainment device to the interior surface 32 of panel 30. Many different devices may be employed for this purpose. In one preferred embodiment of the invention, three separate devices are cooperatively employed to this end. The entertainment device rests in a U-shaped bracket 33 attached to the interior surface 32. Additionally, a strap 36, permanently affixed at one end to the right side of interior surface 32, and adjustably secured to a ring 37 on the left side of interior surface 32, is adjusted to fit snugly over the entertainment device. Strap 36 is preferably provided with a rubbery material on at least one surface thereof, to deter slipping of the entertainment device from under said strap. A rubbery material suitable for this application has a high coefficient of friction in contact with plastic or metal cases commonly employed with entertainment devices. Thirdly, one or more patches of hook-and-loop material, shown at 38 and 39, may be attached to the interior surface 32. Mating patches of hook-and-loop material may be adhesively bonded to the case of the entertainment device. One suitable type of hook-and-loop material is known by the trade name Velcro. Some types of fabric have the capability of engaging hook-type Velcro patches; the use of such a fabric on the interior surface 32 is deemed to be equivalent to attaching a separate patch to said interior surface. Further, a compliant bump 48 in the interior surface 32, said bump having a surface made from a rubbery material, serves to deter the entertainment device from sliding out of the suspension platform, even in the event of a sudden stop of the passenger vehicle in which it is secured.

The suspension platform is optionally provided with a fourth panel 40, joined by a third flexible connection 35 to the front edge of panel 10. A pocket 43 is provided on one, or both, surfaces of panel 40. The preferred location of pocket 43 is on the front surface 41 of panel 40. In the closed configuration of the suspension platform, panel 40 is disposed between panels 10 and 20, which combine to protect panel 40, and any items stored in pocket 43. In the open configuration of the suspension platform, panel 40 is allowed to hang down, providing easy access to items stored in pocket 43.

Figure 6:
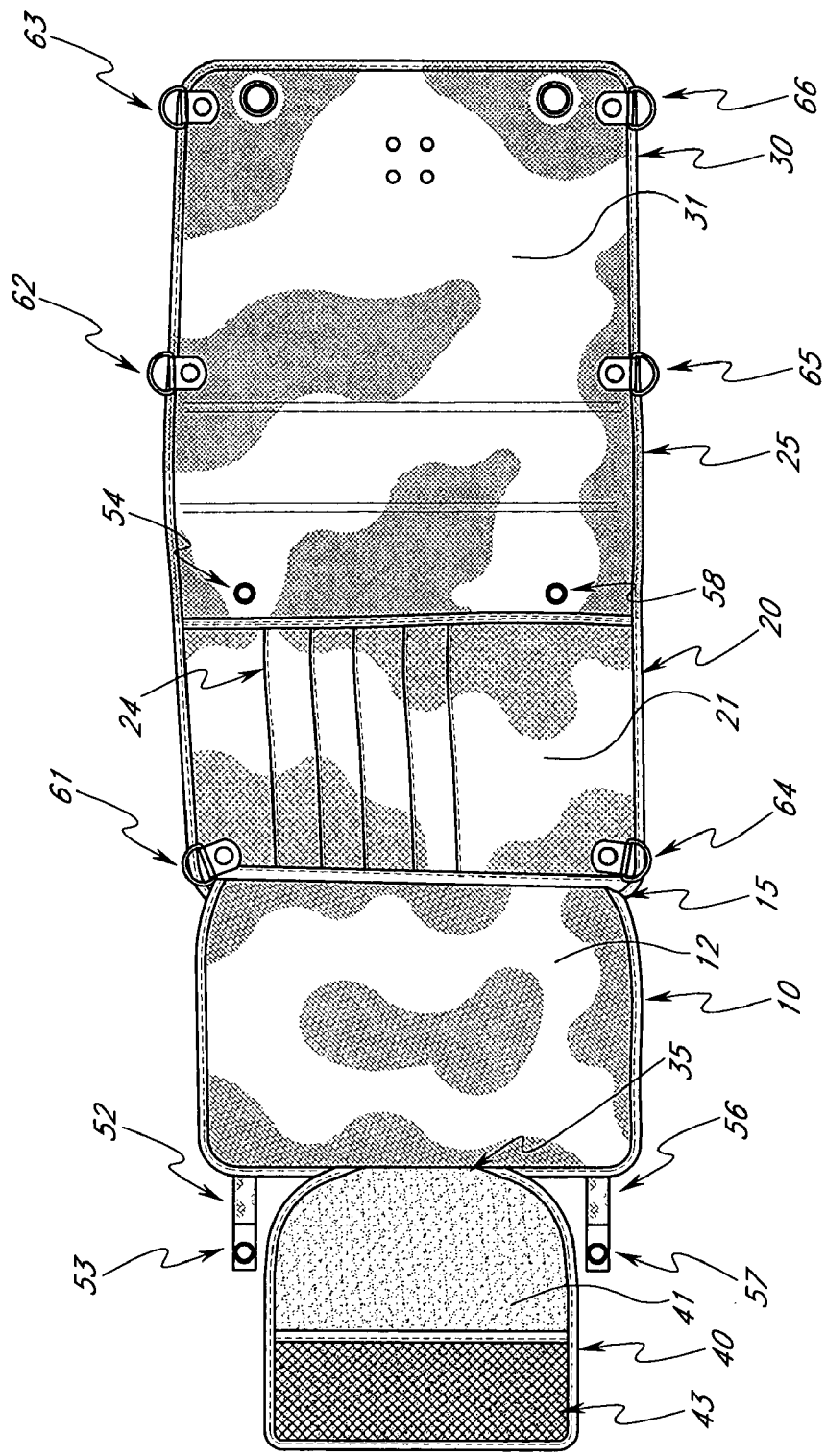
FIG. 6 illustrates, in schematic form, a suspension platform in a partially opened configuration.

FIG. 6 illustrates the suspension platform in a partially opened configuration, to show the relationship of each panel to its neighbors. Panel 40 with pocket 43, flexible connection 35, interior surface 12 of panel 10, flexible connection 15, exterior surface 21 of panel 20, flexible connection 25 and exterior surface 31 of panel 30 are shown from left to right in the figure. In one preferred embodiment, pockets 24 are provided on the exterior surface 21 of panel 20. Such pockets are useful for storing CD ROMs or DVD disks. As shown in FIGS. 1 and 2, such pockets are protected in the closed configuration of the suspension platform.

The suspension platform of one preferred embodiment also comprises means for securing it to the seat backs of one or more seats in a passenger vehicle. Although such means could comprise straps that are permanently attached to the suspension platform, it may be preferable to have such straps separable from the suspension platform. One means of separably attaching such straps 60 to the suspension is a plurality of D-rings attached to the suspension platform. D-rings 61, 62 and 63 are attached to the left side of exterior surfaces 21 and 31 of panels 20 and 30, respectively, and D-rings 64, 65 and 66 are attached to the right side of those exterior surfaces, respectively. Adjustability of the straps that encircle the seats of the passenger vehicle may be achieved by many means that are known to those skilled in the art of luggage manufacture. Various types of buckles, quick disconnect fittings and the like may be employed for this purpose. One particular type of adjustable buckle can be achieved by placing two D-rings at each location shown in the figures. The functionality of whatever straps and buckles that may be employed is that they urge the suspension platform forward, into contact (or close proximity) with the seat back of the front seat of a passenger vehicle. It is the interior surface 22 of panel 20 that may contact the seat back. It is anticipated that the suspension platform can be urged into contact with the seat back as a means of reducing vibration of the entertainment system in response to motion of the passenger vehicle.

Figure 7:
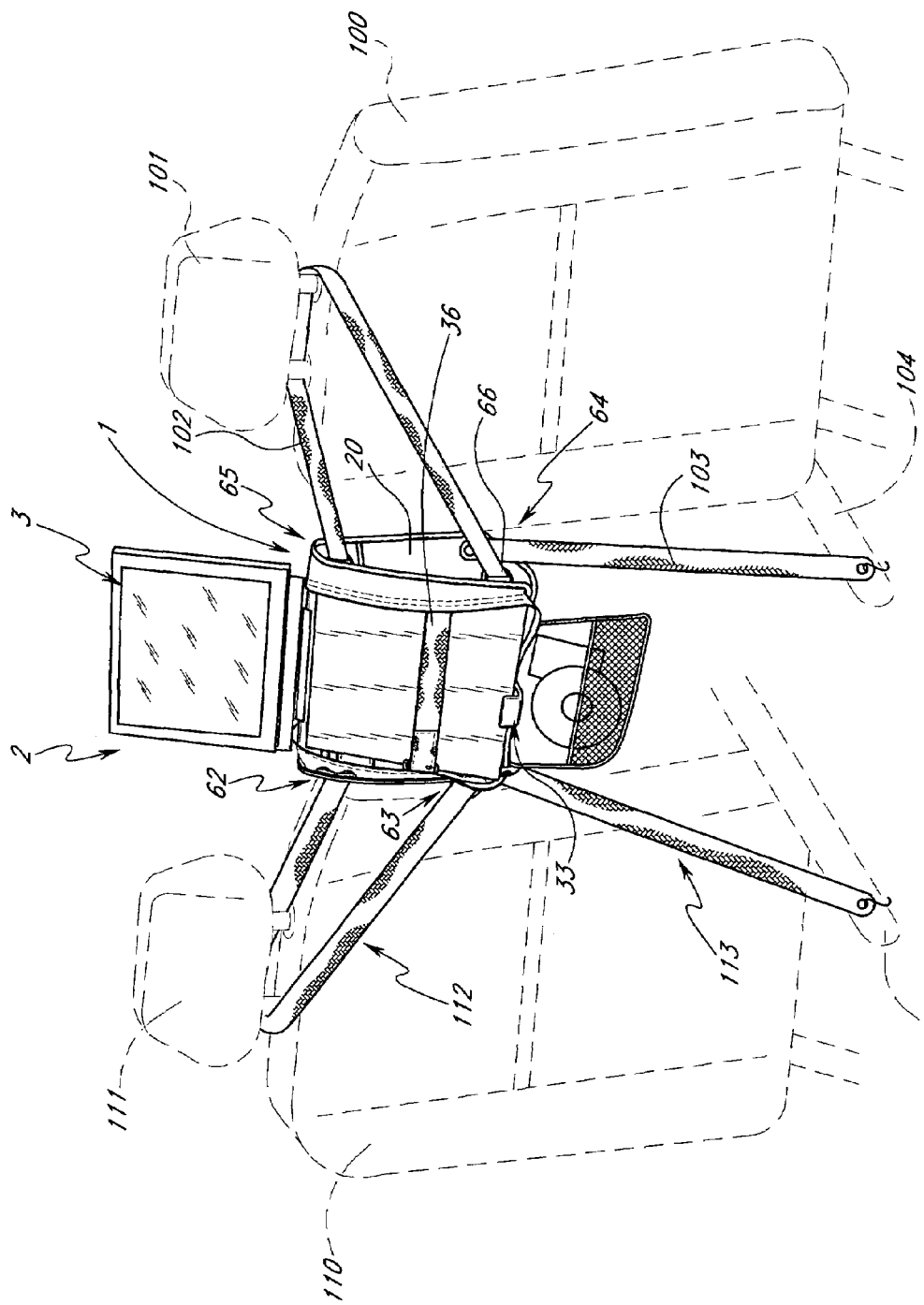
FIG. 7 illustrates, in schematic form, the installation of a suspension platform between two seats of a passenger vehicle.

Another representative application of the suspension platform of one preferred embodiment is illustrated in FIG. 7, which depicts installation between the two front seats of a vehicle. In this application, right front seat 100 and left front seat 110 are provided with head restraints 101, 111 respectively that serve as anchors for two upper straps 102, 112, respectively. Straps 102 and 112 are secured to D-rings 66,65 and 62,63, respectively, thereby allowing for the suspension of the platform 1 between the two seats 100, 110. Two lower straps 103, 113, preferably used in conjunction with S-hooks, are shown secured to the mechanisms 104, 114 by which the positions of the front seats may be adjusted. Alternatively, a single lower strap, secured to the seat adjusting mechanism for the left front seat, through the lower D-rings of the suspension platform, and on to the seat adjusting mechanism for the right front seat, where it is secured thereto. For high back front seats without identifiable head restraints, it may be preferable to employ two horizontal straps encircling each front seat in the manner taught by Perkins. To secure the suspension platform to a single front seat, it may be preferable to encircle the front seat with straps oriented vertically. Vertical straps would presumably affect occupants of a front seat less than horizontal straps. An important aspect of one preferred embodiment is that the configurations of the straps may provide sufficient flexibility to accommodate almost any front seat configuration. The use of multiple D-rings at or near the indicated locations helps provide such flexibility. Any appropriate configuration of the straps is deemed to be part of one preferred embodiment.

FIG. 7 also illustrates the installation of a representative entertainment device, such as a DVD player 2, in the suspension platform 1. The entertainment device 2 includes a viewing screen 3.

Figure 8:
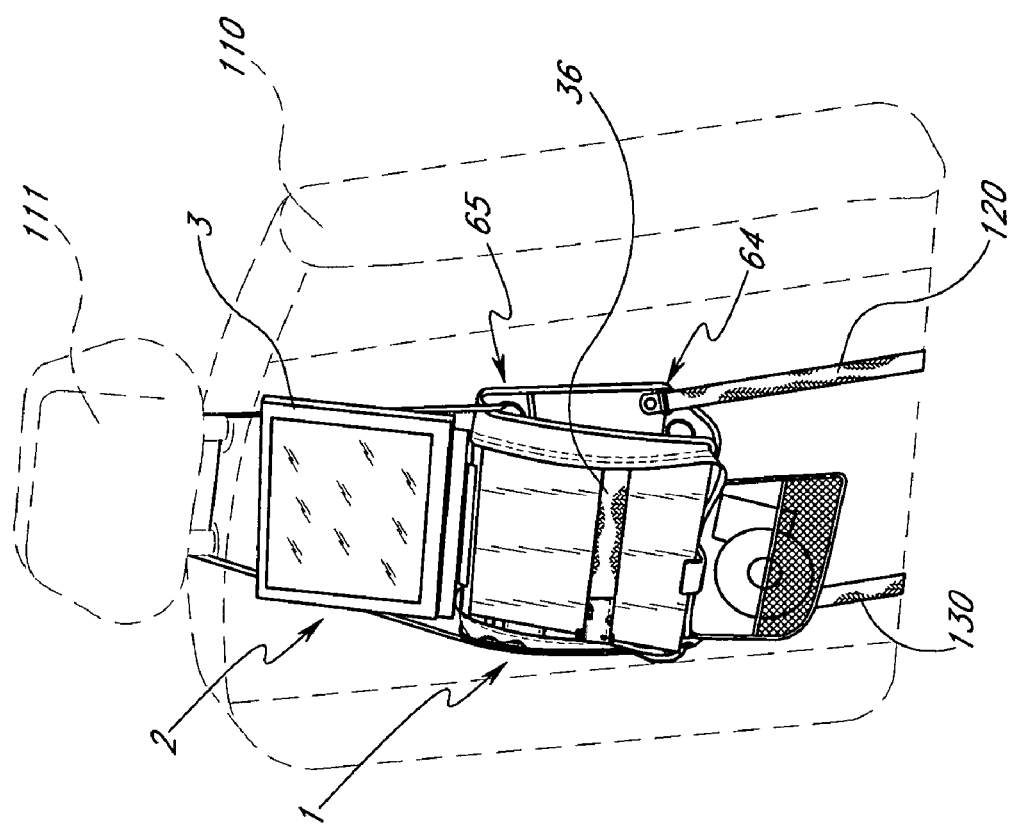
FIG. 8 illustrates, in schematic form, the installation of a suspension platform to the rear of a single seat of a passenger vehicle.

FIG. 8 illustrates the installation of a suspension platform 1 to a single seat 110 of a vehicle. In this embodiment, straps 120, 130 are adjusted to encircle the seat 110 and are attached to the D-rings 64, 65 and 61, 62. Alternatively, a single strap can be attached to D-rings 64, 61 and used to loop around headrest of seat 110. In this embodiment, either D-ring 65 or 62 or both can be attached to or looped around a bar, rod or fixture under seat 110 by a strap.

The suspension platform of one preferred embodiment provides sufficient flexibility in securing it to the front seat of a passenger vehicle that it allows considerable latitude in height of the viewing screen of an entertainment device, thereby accommodating both adults and children.

Entertainment devices of the type contemplated in one preferred embodiment frequently entail the use of many accessories. Some of those accessories might be: CD ROMs or DVD disks; earphones or headsets; spare batteries; and a power supply to enable operation of the entertainment device from the electrical system of the passenger vehicle. To keep all of these accessories collected in a single bag, a separate storage bag is provided as a preferred aspect of one preferred embodiment.

Figure 9:
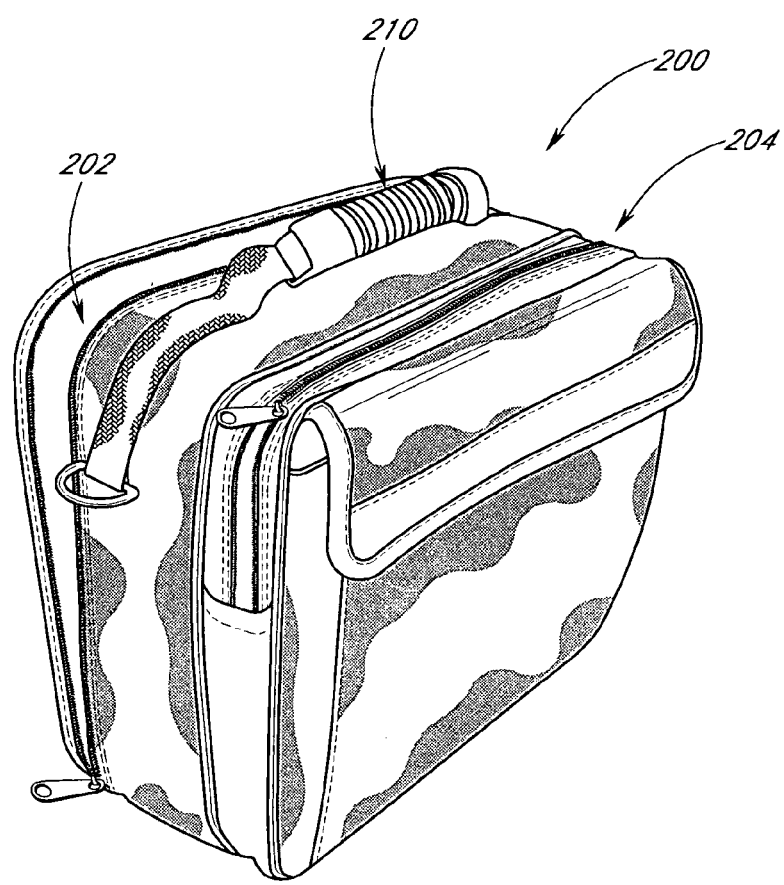
FIG. 9 illustrates a storage bag for storing a suspension platform.

FIG. 9 illustrates a storage bag 200 of one preferred embodiment. Storage bag 200 is preferably provided with at least two compartments; a first compartment 202 is sized to receive the suspension platform, and a second compartment 204 is sized and configured to receive the aforementioned accessories. The storage bag 200 is preferably provided with a movable lid and means for securing that lid during transport or storage; it may also be provided with a handle or carrying strap 210. The general configuration of the storage bag is similar to that of a gadget bag often employed by photographers.

The suspension platform of one preferred embodiment may be constructed of many different materials. The presently preferred materials include the sort of heavy nylon cloth (sometimes identified as "ballistic cloth") used in the manufacture of suitcases and other forms of luggage. This cloth is preferred for exterior surfaces 11, 21 and 31 of panels 10, 20 and 30, and flexible connection 25. Note that a single piece of cloth may be employed to fabricate items 21, 25 and 31 as an integral unit, as suggested in FIG. 6; this is a preferred, but not essential, aspect of the invention. A lighter weight nylon cloth is preferred for the interior surfaces 12, 22 and 32 of panels 10, 20 and 30. Each of the panels 10, 20 and 30 is preferably stiffened by a thin sheet of plastic inserted between the respective interior and exterior surfaces. Other materials, such as cardboard, may be employed for this purpose. A portion of each flexible connection may be free of such stiffeners. The optional panel 40 is of similar construction to the other panels, although the lighter weight cloth may be used for both surfaces. The pocket 43 is preferable fabricated from a mesh material, to facilitate identification of items placed in the pocket. Assembly methods for fabricating the suspension platform, such as by sewing the components together, are known to those skilled in the art of luggage manufacture.

Straps employed in one preferred embodiment are preferably made of nylon web belting. This material is frequently utilized in the manufacture of luggage, and it is known to those skilled in that art.

Although one preferred embodiment has been described with reference to certain preferred embodiments, it will be appreciated that one preferred embodiment is not limited thereby. In particular, the concepts of the one preferred embodiment are fully applicable to alternative means for protecting an entertainment device and removably securing it to a front seat of a passenger vehicle. Those skilled in the art will recognize that minor variations and modifications in the design and manufacture of the entertainment system and suspension platform, as described herein, still lie within the spirit and scope thereof, and such variations and modifications properly fall within the scope of preferred embodiments, which is defined by the following claims.

What is claimed is:

1. An apparatus for removably mounting an entertainment device to at least one seat of a vehicle, said apparatus comprising:
   an entertainment device having a viewing screen portion hinged to a central console portion;
   a platform having a generally triangular cross section comprised of a front portion and rear portion which meet at an upper apex, said front portion configured to receive said central console portion of said entertainment device such that the bottom of said console portion is inclined relative to both the horizontal and vertical and said front portion comprising a retaining member with a variable length extending across a region of the front portion, said retaining member configured to removably retain said central console portion of said entertainment device against said front portion;
   a first strap having an adjustable length with sufficient length to encircle at least a portion of a car seat, the first strap comprising a strap portion attached substantially near an edge of the upper apex of the platform; and a second strap having an adjustable length with sufficient length to encircle at least a portion of a car seat, the second strap comprising a strap portion attached substantially near an edge of the upper apex of the platform.

2. An apparatus as in claim 1, further comprising a panel connecting said front portion to said rear portion opposite said upper apex.

3. An apparatus as in claim 1, wherein the retaining member comprises a strap.

4. An apparatus as in claim 1, wherein said front portion includes a bump covered by rubbery material.

5. An apparatus as in claim 1, further comprising at least one strap for anchoring said platform near the bottom of one seat.

6. An apparatus as in claim 1, further comprising two additional straps portions for securing said platform between two seats.

7. The apparatus of claim 1, wherein the retaining member has a first end permanently affixed to a first side of the front portion and a second end permanently affixed to a second side of the front portion.

8. The apparatus of claim 1, wherein the retaining member comprises two portions removably attached to each other.

9. The apparatus of claim 8, wherein the two portions of the retaining member are removably attached to each other using a hook-and-loop fastener.

10. An apparatus for removably mounting an entertainment device to at least one seat of a vehicle, said apparatus comprising:
    an apparatus with a front portion, a rear portion, and a pivoting portion between said front and rear portions, said apparatus having an open configuration and a closed configuration;
    an entertainment device having a viewing screen portion hinged to a central console portion;
    said front portion and rear portion configured to form a closed container in said closed configuration, said container sized to receive said entertainment device for transporting said device;
    said front portion and rear portion configured to form a platform in an open configuration;
    said platform adapted to be releasably attached to at least one seat of a vehicle with at least a first and a second strap the first strap having an adjustable length with sufficient length to encircle at least a portion of a car seat, the first strap comprising a strap portion attached substantially near a corner of the platform in the open configuration; and
    a second strap having an adjustable length with sufficient length to encircle at least a portion of a car seat, the second strap comprising a strap portion attached substantially near a corner of the platform in the open configuration; and
    said platform capable of retaining said central console portion of said entertainment device by a retaining member with a variable length.

11. An apparatus as in claim 10, further comprising a panel connecting said front portion to said rear portion opposite said pivoting portion in said open configuration.

12. An apparatus as in claim 10, wherein said retaining member comprises a strap.

13. An apparatus as in claim 10, further comprising a bump covered by rubbery material on said front portion.

14. An apparatus as in claim 10, further comprising a zipper for attaching the front portion and the rear portion together in said closed configuration.

15. An apparatus as in claim 10, further comprising at least one strap portion for anchoring the apparatus near the bottom of the seat.

16. A suspension platform for removably securing an entertainment device in a passenger vehicle having at least one front seat and at least one rear seat, comprising:
   an entertainment device having a viewing screen portion hinged to a central console portion;
   first, second and third panels, each having an interior surface and an exterior surface;
   a first flexible connection between a first edge of said first panel and a first edge of a said second panel;
   a second flexible connection between a second edge of said second panel and a first edge of said third panel;
   a zipper comprised of two sets of engaging teeth, one set on at least a first sidewall portion permanently affixed to the second panel and the other set on at least a second sidewall portion permanently affixed to the third panel, said zipper configured to removably attach said first and second sidewall portions to each other to thereby form a closed configuration of said second and third panels;
   a connector having two engaging portions for connecting the first panel to the second panel;
   a first strap for securing said central console portion of said entertainment device to said interior surface of said third panel; and
   four straps attached to the panels for securing said suspension platform to at least one front seat.

17. The suspension platform as recited in claim 16, further comprising a bump on said interior surface of said third panel, wherein said bump is covered with rubbery material.

18. The suspension platform as recited in claim 16, wherein the connector is a snap.

19. The suspension platform as recited in claim 16, wherein the connector is hook-and-loop material.

* * * * *

UNITED STATES PATENT AND TRADEMARK OFFICE
CERTIFICATE OF CORRECTION

PATENT NO. : 7,360,649 B2  Page 1 of 1
APPLICATION NO. : 10/712388
DATED : April 22, 2008
INVENTOR(S) : Jeffrey A. Swaim et al.

It is certified that error appears in the above-identified patent and that said Letters Patent is hereby corrected as shown below:

In Column 1, Line 29, please delete "modem" and insert -- modern --, therefore.

Signed and Sealed this

Twenty-third Day of December, 2008

JON W. DUDAS
*Director of the United States Patent and Trademark Office*